US010614263B2

United States Patent
Mei

(10) Patent No.: US 10,614,263 B2
(45) Date of Patent: Apr. 7, 2020

(54) FILE INFORMATION INTERLINKING METHOD

(71) Applicant: FUJIAN FOXIT SOFTWARE DEVELOPMENT JOINT STOCK CO., LTD., Fuzhou, Fujian (CN)

(72) Inventor: Jianping Mei, Fuzhou (CN)

(73) Assignee: FUJIAN FOXIT SOFTWARE DEVELOPMENT JOINT STOCK CO., Fuzhou, Fujian (JP)

( * ) Notice: Subject to any disclaimer, the term of this patent is extended or adjusted under 35 U.S.C. 154(b) by 162 days.

(21) Appl. No.: 15/779,947

(22) PCT Filed: Nov. 8, 2016

(86) PCT No.: PCT/CN2016/000617
§ 371 (c)(1),
(2) Date: May 30, 2018

(87) PCT Pub. No.: WO2017/092150
PCT Pub. Date: Jun. 8, 2017

(65) Prior Publication Data
US 2018/0349333 A1    Dec. 6, 2018

(30) Foreign Application Priority Data

Dec. 3, 2015    (CN) .......................... 2015 1 0881472

(51) Int. Cl.
*G06F 40/134*    (2020.01)
*G06F 16/93*    (2019.01)
(Continued)

(52) U.S. Cl.
CPC .............. *G06F 40/134* (2020.01); *G06F 9/54* (2013.01); *G06F 16/94* (2019.01); *G06F 40/169* (2020.01); *G06Q 30/0241* (2013.01); *H04L 67/10* (2013.01)

(58) Field of Classification Search
CPC .......................... G06F 17/2235; G06F 17/241
See application file for complete search history.

(56) References Cited

FOREIGN PATENT DOCUMENTS

| CN | 101404080 | 4/2009 |
|---|---|---|
| CN | 104102692 | 10/2014 |
| CN | 105045770 | 11/2015 |

OTHER PUBLICATIONS

Written Opinion and International Search Report of PCT/CN2016/000617 dated Feb. 14, 2017; 10 pages (English and Chinese).

*Primary Examiner* — Asher D Kells
(74) *Attorney, Agent, or Firm* — Rankin, Hill & Clark LLP

(57) ABSTRACT

A file information interlinking method comprises the following steps: when creating a file, generating a universally unique interlink identifier, and storing, on a cloud server, according to a one-to-one correspondence between the universally unique interlink identifier and data information corresponding to the file, the data information corresponding to the file, wherein the data information comprises file creation, distribution, modification, history and permission information (S110); computing blank areas in different pages of the file, and applying a layer processing method to display advertisement information on the blank areas in the different pages (S120); and generating, on a peripheral edge of a layer, an annotation of a web link, wherein a click on the web link can trigger a JavaScript script to obtain the unique interlink identifier, combine the same with known link information to jump to the data information corresponding to the file on the cloud server (S130).

7 Claims, 1 Drawing Sheet

(51) Int. Cl.
*G06F 40/169* (2020.01)
*G06F 9/54* (2006.01)
*G06Q 30/02* (2012.01)
*H04L 29/08* (2006.01)

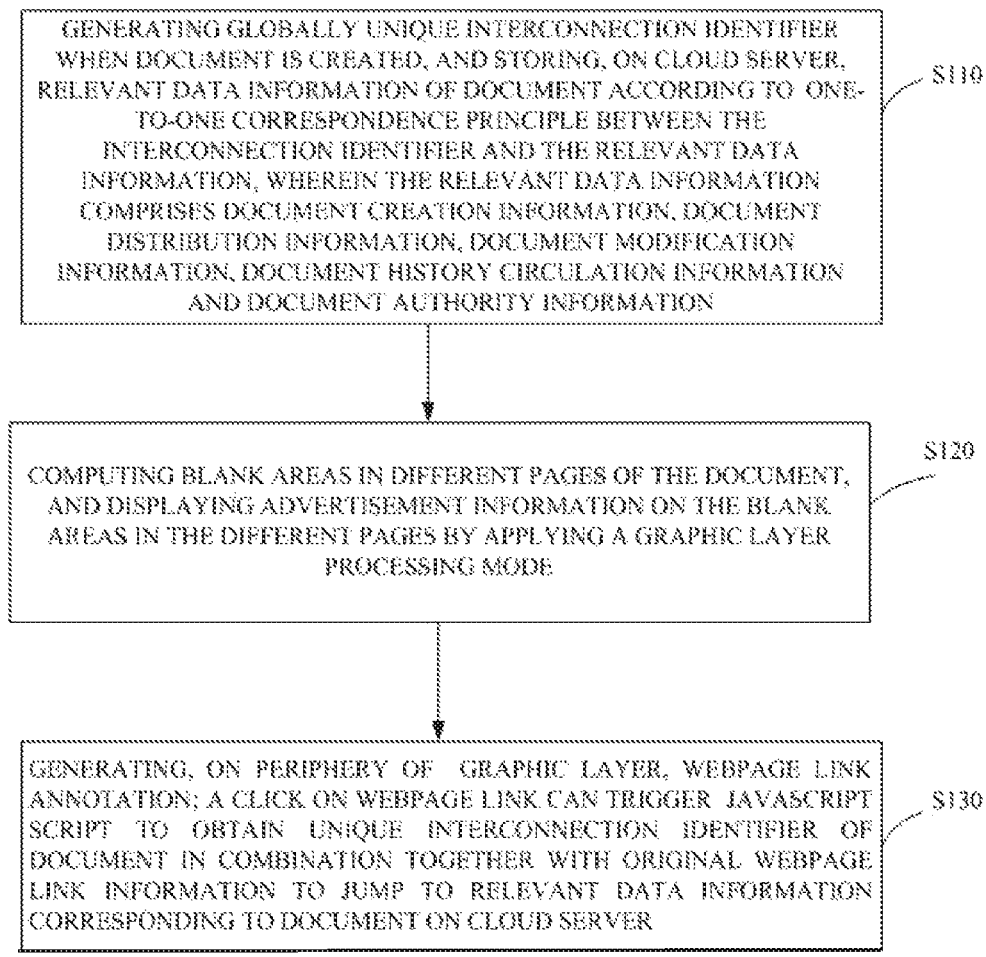

US 10,614,263 B2

FILE INFORMATION INTERLINKING METHOD

TECHNICAL FIELD

The present invention relates to a technical field of document management, and in particular, to a technical field of a document information interconnection method.

BACKGROUND

Traditional documents single documents, which are static and separate. An amended version of a document, which has been modified, is also independent of an original version of the document. And the amended version of the document has not any technical correlation to the original version of the document. Therefore, it is inconvenient for a user to know information of a dynamic distribution history of such documents.

SUMMARY OF THE INVENTION

The present invention provides a document information interconnection method, which is used for tracking the dynamic distribution history of interconnected documents, for performing a effective, safe and long-distance manipulation and protection on the interconnected documents which is distributed, and for actually realizing a safe management of the documents in a whole process.

In order to achieve said objective, the present invention provides a document information interconnection method, comprising the following steps:

generating a globally unique interconnection identifier when a document is created, and storing, on a cloud server, relevant data information of the document according to a one-to-one correspondence principle between the interconnection identifier and the relevant data information of the corresponding document, wherein the relevant data information comprises document creation information, document distribution information, document modification information, document history circulation information and document authority information;

computing blank areas in different pages of the document, and displaying advertisement information on the blank areas in the different pages by applying a graphic layer processing mode; and generating, on a periphery of a graphic layer, an webpage link annotation, wherein a click on the webpage link can trigger a JavaScript script to obtain the unique interconnection identifier of the document in a combination together with original webpage link information to jump to the relevant data information corresponding to the document on the cloud server.

Further, the document is a PDF document or a document of other format.

Further, the document information interconnection method further comprises the following step:

the advertisement information further recommends a user to use a specific application program and a specific version thereof so as to support a function of document interconnection.

Further, the advertisement information reminds a download link of the specific application program.

Further, the graphic layer is configured to be visible only for a display view.

Further, when a user clicks on a jumped webpage link object, the performances under the following two conditions are as follows:

if the specific application program is supported by a client, and a user's identity can be accurately obtained, the cloud server compares authority information of the user with the document authority information in the relevant data information of the corresponding document, and displays information specified by a corresponding authority according to the authority of the user;

if the specific application program is not supported by the client, or a user's identity cannot be accurately obtained, the relevant data information of the document configured by a document owner to the public is matched and found according to the interconnection identifier of the document; wherein, the document owner can configure personal information of the document owner himself and/or obtain more relevant document information by online interaction or offline communication, the more relevant document information comprises the document creation information, the document distribution information, the document modification information, the document history circulation information and the document authority information.

Further, the graphic layer is displayed by default if the function of document interconnection is supported by the client, and the graphic layer is not displayed by default if the function of document interconnection is not supported by the client.

General document program promotion modes comprise an introduction on a related portal website, and an interpretation made by developing associated functional applications, therefore, the audience rate of users cannot be maximized. According to the present invention, an function of document interconnection is added for documents, such that a user can feel a convenience of the document programs with the function of document interconnection. The document information interconnection method is used for tracking the dynamic distribution history of interconnected documents, for performing a effective, safe and long-distance manipulation and protection on the interconnected documents which is distributed, and for actually realizing a safe management of the documents in a whole process.

BRIEF DESCRIPTION OF THE DRAWINGS

In order to illustrate the technical solutions in the embodiments of the present invention or in the prior art more clearly, the drawings used in the description of the embodiments or the prior art will be briefly described below. Obviously, the drawings in the following description are merely some embodiments of the present invention. For an ordinary person skilled in the art, other drawings may also be obtained based on these drawings without any creative work.

FIG. 1 is a flowchart of a document information interconnection method according to an embodiment of the present invention.

DETAILED DESCRIPTION OF THE EMBODIMENTS

The technical solution in the embodiment of the present invention will be described clearly and completely below in conjunction with the drawing in the embodiment of the present invention. Obviously, the described embodiment is only a part of the embodiments of the present invention, not all of the embodiments. Based on the embodiment of the present invention, all of the other embodiments obtained by an ordinary person skilled in the art without paying creative work should fall into the protection scope of the present invention.

FIG. 1 is a flowchart of a document information interconnection method according to an embodiment of the present invention. As shown in FIG. 1, the document information interconnection method comprises the following steps:

S110, generating a globally unique interconnection identifier when a document is created, and storing, on a cloud server, relevant data information of the document according to a one-to-one correspondence principle between the interconnection identifier and the relevant data information of the corresponding document, wherein the relevant data information comprises document creation information, document distribution information, document modification information, document history circulation information and document authority information;

S120, computing blank areas in different pages of the document, and displaying advertisement information on the blank areas in the different pages by applying a graphic layer processing mode; and S130, generating, on a periphery of a graphic layer, an webpage link annotation, wherein a click on the webpage link can trigger a JavaScript script to obtain the unique interconnection identifier of the document in a combination together with original webpage link information to jump to the relevant data information corresponding to the document on the cloud server.

In order to facilitate using a function of document interconnection by a user, the advertisement information further recommends the user to use a specific application program and a specific version thereof so as to support a function of document interconnection.

In order to facilitate downloading the corresponding application by the user, the advertisement information further reminds a download link of the specific application program.

During a specific implementation, the graphic layer may be configured to be visible only for a display view and not visible for other views such as a print view.

In a preferred embodiment, when the user clicks a network link, the cloud server compares authority information of the user with the document authority information in the relevant data information of the corresponding document, and displays information specified by a corresponding authority according to the authority of the user.

A detailed description will be made as below by taking a PDF document as an example.

We create an interconnected PDF application program called ConnectedPDF. When a PDF creator creates a PDF document, the following features will be integrated into a PDF generator by SDK packaging: issuing a globally unique ConnectedPDF ID that can be used to identify unique documents, unique versions, etc; and adding graphic layers that conform to a PDF standard on blank areas in different pages of the document. For example, graphic layers may display ConnectedPDF promotions. The graphic layers may be further configured to be visible only for a display view, but invisible for other views such as a print view. There is a layer Link annotation outside the graphic layer. The layer Link annotation may trigger an action to open information of tracking a history recorded by a server corresponding to this current unique ConnectedPDF document. That is, The layer Link annotation may trigger an action to view who does what operations to the current document at which position, or may displaying different information as specified by the authorities of different users, which may be a simplified summary report, or detailed user operation information, etc. Therefore, all users can open this ConnectedPDF document in a PDF-compliant reader to view related concepts and promotions of ConnectedPDF, and also experience a ConnectedPDF version tracking service based on the unique identifier, as well as more document services and management.

The PDF information interconnection method comprises the following flows:

issuing a unique identifier by a generator that supports ConnectedPDF when a document is created;

computing blank areas in different pages of the document, and displaying advertisement information such as ConnectedPDF promotion advertisement on the blank areas by applying a PDF graphic layer processing mode; and generating, on a periphery of a graphic layer, an annotation of a Link, wherein the Link's actions jump to a specified web page so as to show the services and management associated with the document according to the unique identifier of this document.

In this way, after a ConnectedPDF document is generated, when the PDF document is opened using a reader that does not support ConnectedPDF, it is easy for the user to know the difference between documents, to know what kind of service and management this ConnectedPDF can bring can be displayed, and to know a real management and a real service of ConnectedPDF.

General document program promotion modes comprise an introduction on a related portal website, and an interpretation made by developing associated functional applications, therefore, the audience rate of users cannot be maximized. According to the present invention, an function of document interconnection is added for documents, such that a user can feel a convenience of the document programs with the function of document interconnection. The document information interconnection method is used for tracking the dynamic distribution history of interconnected documents, for performing a effective, safe and long-distance manipulation and protection on the interconnected documents which is distributed, and for actually realizing a safe management of the documents in a whole process.

An ordinary person skilled in the art may understand that the accompanying drawing is merely a schematic diagram of one embodiment, and modules or processes in the accompanying drawing are not necessarily required to implement the present invention.

An ordinary person skilled in the art may understand that modules in a device in the embodiment may be distributed in the device of the embodiment according to the description of the embodiment, or may also be correspondingly changed to be located in one or more devices different from that of the present embodiment. The modules in the above embodiment may be combined into one module, or may also be further split into a plurality of sub-modules.

It should be finally noted: the above embodiment is only used to illustrate the technical solution of the present invention, rather than limiting the same; although the present invention has been described in detail with reference to the foregoing embodiment, an ordinary person skilled in the art should understand that: the technical solution described in the foregoing embodiment may still be modified, or some of the technical features may be equivalently replaced; and these modifications or replacements do not make the essence of the corresponding technical solution depart from the spirit and scope of the technical solution of the embodiment of the present invention.

The invention claimed is:

1. A document information interconnection method, comprising the following steps:

generating a globally unique interconnection identifier when a document is created, and storing, on a cloud server, relevant data information of the document according to a one-to-one correspondence principle between the interconnection identifier and the relevant data information of the corresponding document, wherein the relevant data information comprises document creation information, document distribution information, document modification information, document history circulation information and document authority information;

computing blank areas in different pages of the document, and displaying advertisement information on the blank areas in the different pages by applying a graphic layer processing mode; and generating, on a periphery of a graphic layer, an webpage link annotation, wherein a click on the webpage link can trigger a JavaScript script to obtain the unique interconnection identifier of the document in a combination together with original webpage link information to jump to the relevant data information corresponding to the document on the cloud server.

2. The document information interconnection method according to claim 1, wherein the document is a PDF document or a document of other format.

3. The document information interconnection method according to claim 1, wherein the advertisement information further recommends a user to use a specific application program and a specific version thereof so as to support a function of document interconnection.

4. The document information interconnection method according to claim 3, wherein the advertisement information further reminds a download link of the specific application program.

5. The document information interconnection method according to claim 1, wherein the graphic layer is configured to be visible only for a display view.

6. The document information interconnection method according to claim 1, wherein when a user clicks on a jumped webpage link object, the performances under the following two conditions are as follows:

if the specific application program is supported by a client, and a user's identity can be accurately obtained, the cloud server compares authority information of the user with the document authority information in the relevant data information of the corresponding document, and displays information specified by a corresponding authority according to the authority of the user;

if the specific application program is not supported by the client, or a user's identity cannot be accurately obtained, the relevant data information of the document configured by a document owner to the public is matched and found according to the interconnection identifier of the document; wherein, the document owner can configure personal information of the document owner himself and/or obtain more relevant document information by online interaction or offline communication, the more relevant document information comprises the document creation information, the document distribution information, the document modification information, the document history circulation information and the document authority information.

7. The document information interconnection method according to claim 1, wherein the graphic layer is displayed by default if the function of document interconnection is supported by the client, and the graphic layer is not displayed by default if the function of document interconnection is not supported by the client.

* * * * *